Nov. 13, 1945. G. L. TILBROOK Re. 22,692

RHYTHMETER FOR DETERMINING STERILITY AND FERTILITY

Original Filed Feb. 16, 1943 3 Sheets-Sheet 1

INVENTOR
Gilmore L. Tilbrook
BY
Harry Lea Dodson
ATTORNEY

RHYTHMETER FOR DETERMINING STERILITY AND FERTILITY

Original Filed Feb. 16, 1943 3 Sheets-Sheet 2

INVENTOR
Gilmore L. Tilbrook
BY
Harry Lea Dodson
ATTORNEY

RHYTHMETER FOR DETERMINING STERILITY AND FERTILITY

Original Filed Feb. 16, 1943 3 Sheets-Sheet 3

INVENTOR.
Gilmore L. Tilbrook
BY
Harry Lea Dodson
attorney.

Reissued Nov. 13, 1945

Re. 22,692

UNITED STATES PATENT OFFICE 22,692

RHYTHMETER FOR DETERMINING STERILITY AND FERTILITY

Gilmore Lee Tilbrook, Washington, D. C.

Original No. 2,343,592, dated March 7, 1944, Serial No. 476,050, February 16, 1943. Application for reissue July 24, 1945, Serial No. 606,731

5 Claims. (Cl. 40—115)

My invention relates to that class of devices directed to ascertaining the fertile period in the menstrual cycle of potential mothers, both human and animal.

It is well known that in each menstrual cycle pregnancy occurs only when the egg, freed by ovulation, is fertilized by spermatozoa.

The principal object of my invention is to provide a device that ascertains the period most likely to produce pregnancy.

A further object is to provide a device that will readily determine the longest and shortest menstrual cycles experienced in any particular instance.

A further object is to provide a simple device capable of being used by doctors, veterinarians and those licensed to advise on the subject of pregnancy.

A further object is to provide a device that has all the needed scales, indicia and data to correct for variations in the menstrual cycle in determinating the fertile period.

A further object is to provide a device that makes available to those seeking medical advice, a method of planned parenthood without the use of mechanical or chemical contraceptives.

The medical reasons for planned parenthood due to too rapid succession of children, high death rate of both mothers and babies, poor health of the mothers, and serious diseases, are so well known as not to need discussion here.

The medical profession has determined that the period of fertility is preceded and followed by periods of sterility in each menstrual cycle.

The period of ovulation in the human female has been variously set at from twelve to sixteen days before the next menstrual period. Recent experiments have definitely set the day of ovulation at the fifteenth day before the next succeeding menstruation and in various animals it varies from less to more than 15 days.

In computing the fertile period because of the length of life of the ova and the spermatozoa, two days are added before the ovulation day; because of the irregularity of even the most regular menstrual period, a correction for the longest and shortest periods must be made. The greatest variation (not to be considered a pathological case) has been authoritatively set at ten days. Because short months and leap year add to the corrections necessary in any accurate computation, provision therefore has been made.

My means of accomplishing this result may be more readily apprehended by having reference to the accompanying drawings which are hereunto annexed and made a part of this specification in which—

Fig. 2 is a cross section taken on the line 2—2 in Fig. 1;

Similar reference numerals refer to similar parts throughout the entire specification.

Figure 1:
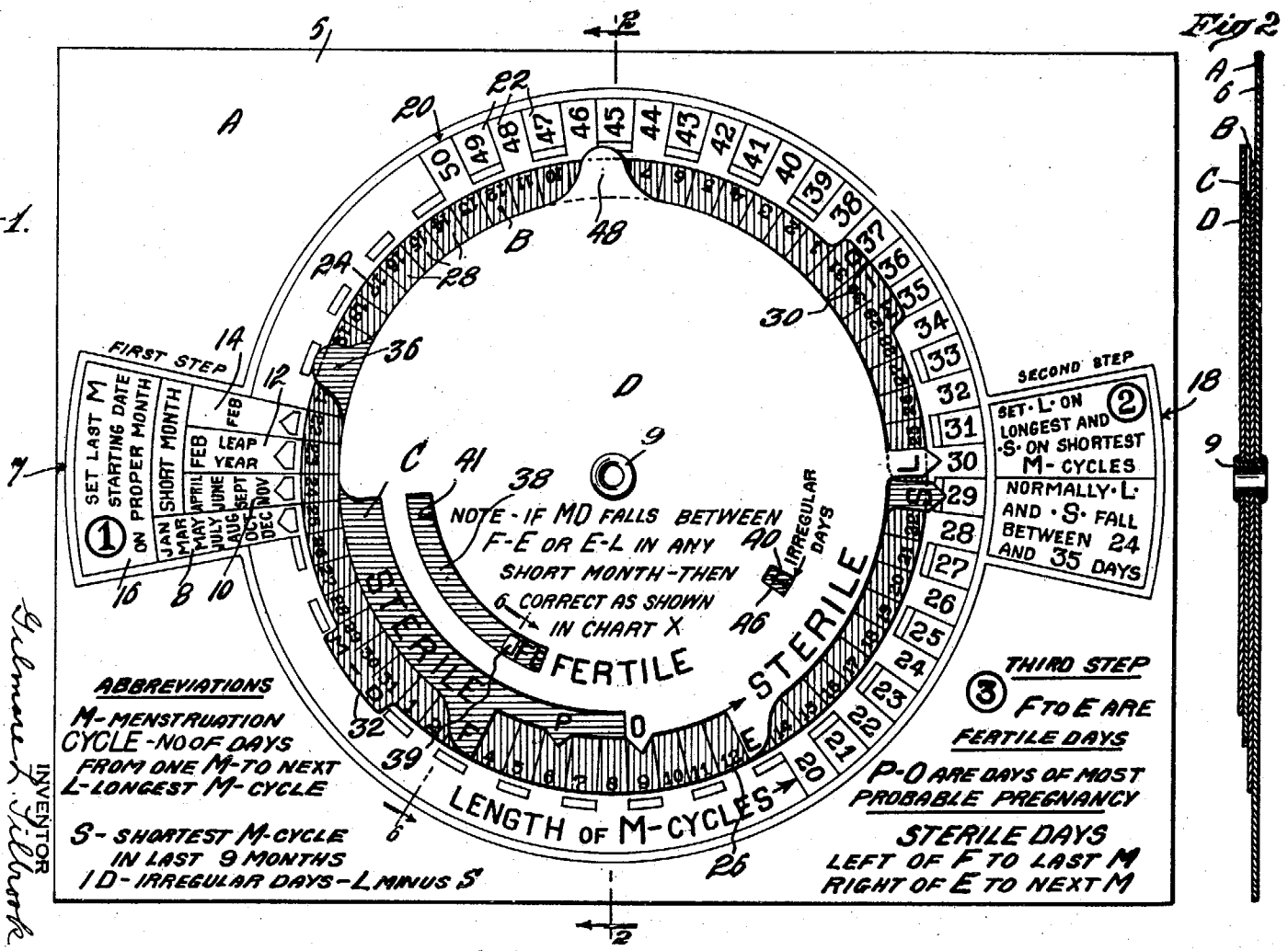
Fig. 1 is a plan view of my improved device completely assembled.
Figure 4:
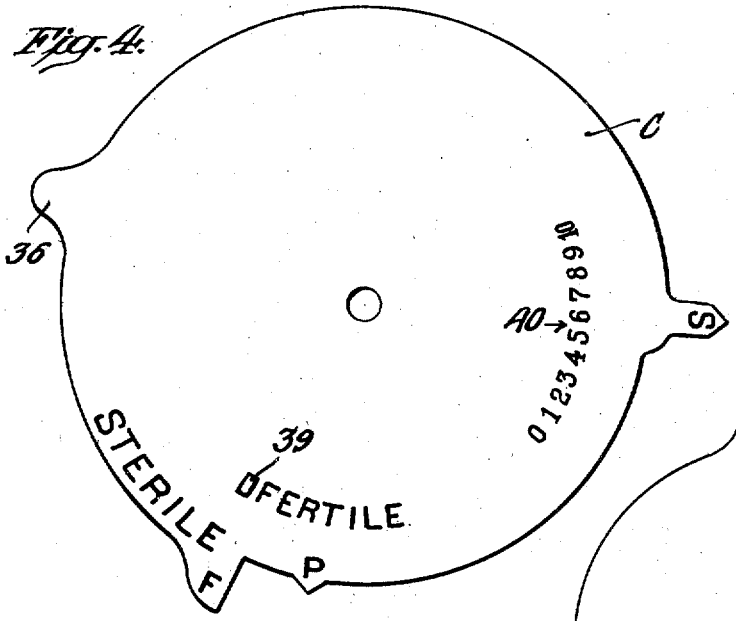
Fig. 4 is a plan view of the intermediate disk.
Figure 3:
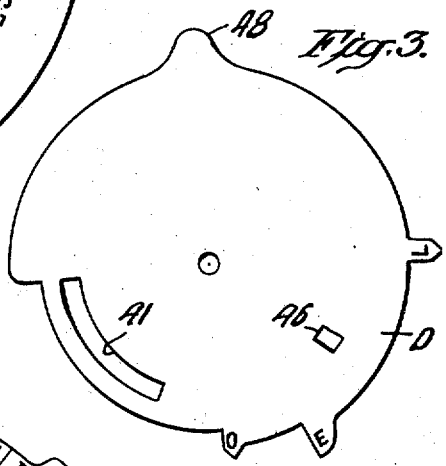
Fig. 3 is a plan view of the top disk.
Figure 5:
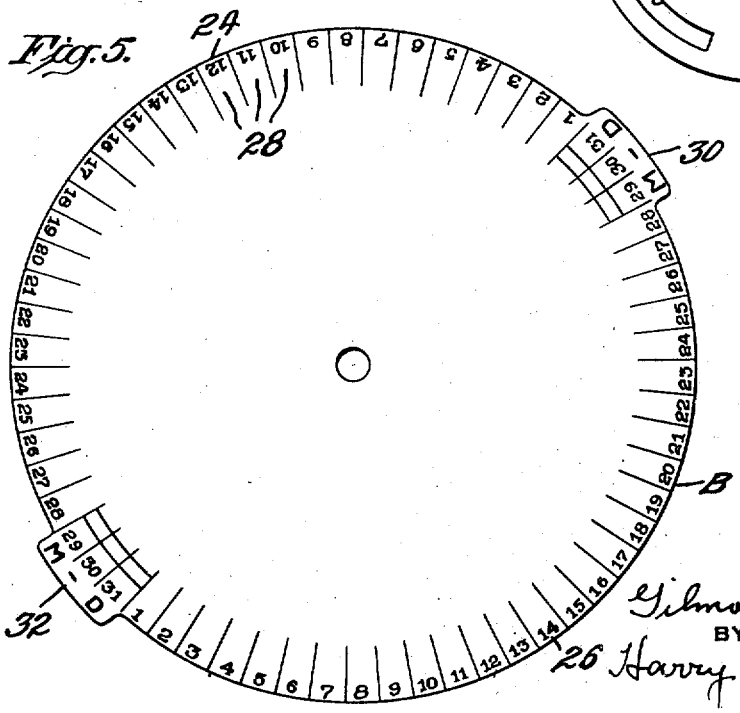
Fig. 5 is a plan view view of the bottom disk.
Figure 7:
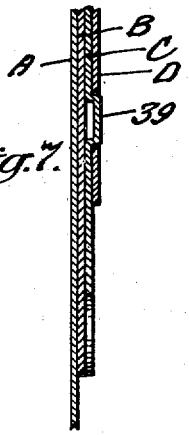
Fig. 7 is a fragmentary detail view in section taken on the line 6—6 in Fig. 1.
Figure 6:
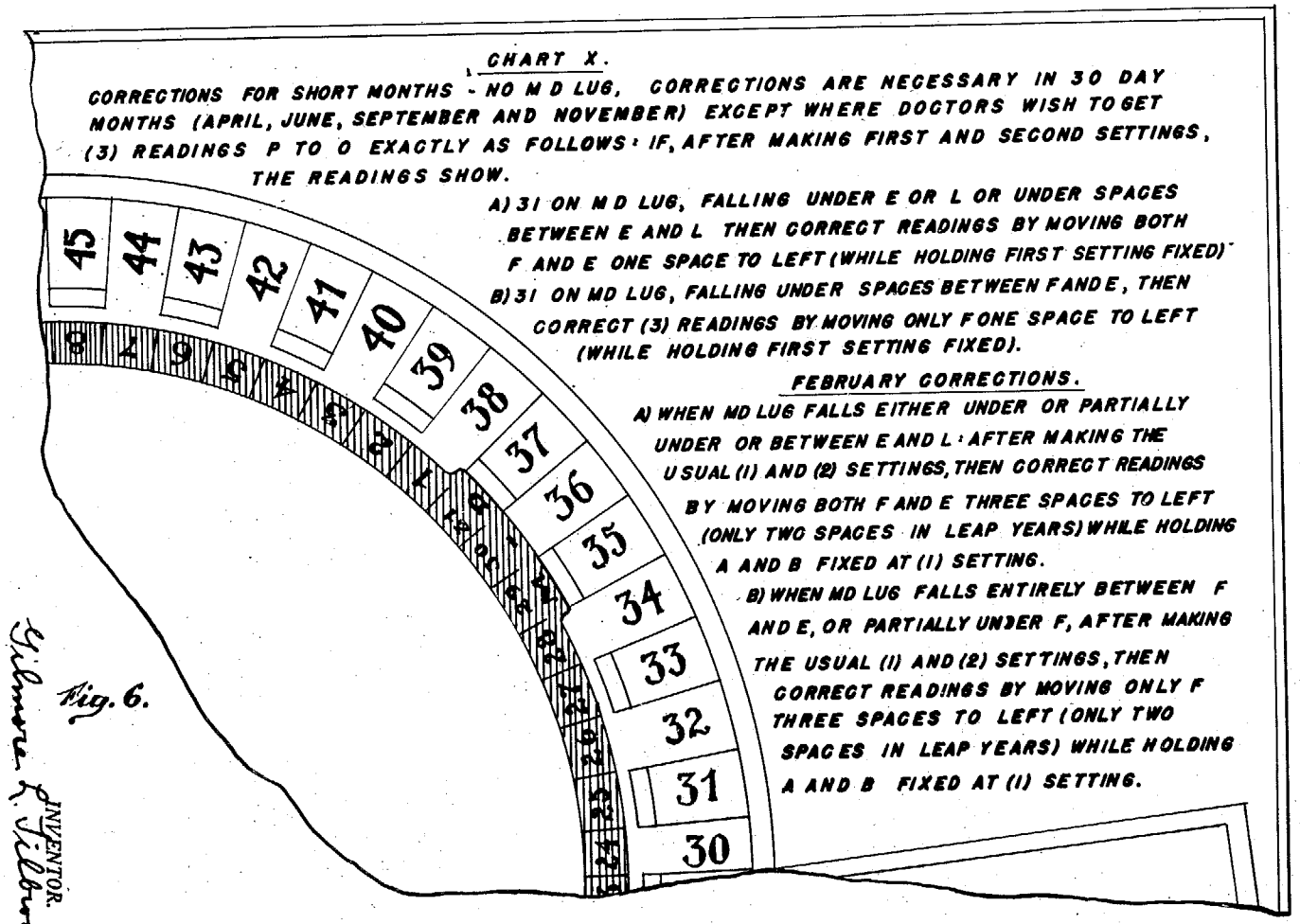
Fig. 6 is an enlarged fragmentary view of the upper right hand corner of the bottom disk.

As shown in the drawings, my device consists of a base 6, hereinafter designated as scale A. At the center of this base is located a pin 9. Upon the pin 9 I mount three rotatable discs B, C, and D, each of which has a central opening to receive the pin 9. These discs are superimposed upon the base 6 and one another respectively. They are rotatable upon the pin 9, with relation to the base 6 and to each other. These various parts are provided with lugs, indicia and apertures which provide the means for attaining the objectives when employed in accordance with my invention.

On the base 6 which for convenience is called scale A is scribed a circle 20, a portion of which is divided by radial line segments 22 arranged within the circle 20. These segments 22 have printed or stamped thereon a numeral sequence preferably beginning with the numeral 20 and as shown extending to numeral 50. As indicated in this circle these numbers correspond to the menstrual cycle days. It will be understood that for animals less than a twenty day menstrual cycle, additional numerals may be provided.

At the left of this circle 20, there is provided a space 7 which is divided into a number of columns 8, 10, 12 and 14. The first one, 8, contains the names of the longer months. The second, 10, contains the names of the shorter months. The third, 12, contains the name of the month of February in leap year, while the fourth, 14, contains the name of February, in its regular twenty-eight day period. At the top of these columns in a space designated 16, are instructions for the first step in the operation. At a point preferably diametrically opposite the space 7 is a space 18, marked second step, similar in outline to the space 7. This space 18 is marked second step and contains instructions for the second step in using the device. The surface of the scale or disc B is divided into two semicircles 24 and 26, each of which has a plurality of equally spaced segments 28 bearing the numbers 1 to 31 consecutively. These numbers which correspond to the calendar days are located adjacent the periphery of disc B, and register with the segments 22 on disc A. The disc B is provided with lugs 30 and 32, which are marked M—D (meaning missing days) and extend outwardly from the periphery of the disc B at points diametrically opposite each other and located opposite the segments 28 which bear the numerals 29, 30, and 31.

The scale or disc C which is also mounted on the pin 9 has outwardly extending lugs marked F, P, and S respectively, also there is provided a projection 36 which extends radially and serves as a handle for conveniently rotating this disc. Lug S is the pointer for the shorter "M-cycle." Lug P is the start of the "most probable pregnancy days"—the first day. Lug F is the last day of the first "sterile period." As is shown there are seventeen spaces between the right side of the S lug, and the right side of the P lug, and there are two spaces between the left of the P and the right side of the F lug. The periphery between F and S is slightly undercut, with the exception of the lug P. A segment 38, of an annulus on the disc C bears a series of numbers 40 preferably white on a dark background.

Opposite the lug P on the same radius as the segment 38 appears the word Fertile also on a segment of an annulus. A detent 39 is formed at the beginning of this word to engage an arcuate slot 41 in disc D and prevents its movement beyond a predetermined point.

As referred to above I provide a third rotatable disc known as scale D which is superimposed on disc C and rotates on pin 9. This disc has three radially extending lugs designated respectively O (probable pregnancy), E (fertile period), and L (longest in menstrual period).

Referring to the drawings it will be seen that there is an arcuate slot 41 in which the detent 39 moves. The dark segment 38 of scale C is also visible when in register therewith. A window 46, in scale D is positioned to register with a series of numerals 40 to show the number of irregular days.

It will be clear that when the disc D is rotated until the detent 39 abuts the end of the arcuate slot 41 the disc can not move enough to bring the window 46 beyond the numeral 10, that is because it has been decided by medical authorities, that any irregularity in menstruation which extends ten days, in a period of eight or nine months is a pathological case, and can not use this method for planning parenthood.

A lug 48 extends from the periphery of disc D which serves as a handle on scale D for rotation purposes.

To illustrate the operation of my invention I provide a hypothetical case, although it is well known that at least eight menstrual cycle-histories should be used in determining the longest and shortest periods experienced, I shall take only two for illustrative purposes.

Thus, supposing the patient's dates to be July 3rd, August 1st, and August 25th. As explained above I place the numeral 3 on scale B opposite column 8 on scale A, this is for the date July 3rd, since the next menstrual day was August 1st. I read on scale B and see that opposite the numeral 1 of scale B is the number 28 on scale A. Thus the menstrual cycle was a twenty-eight day period.

Repeating the process, I place the numeral 1 on scale B opposite the month of August on scale A. Then since the next menstrual day was August 25th, I read opposite 25 on scale B and find 24 on scale A. Thus this period was a 24 day cycle. Taking these two dates to be the longest and shortest menstrual period found in at least an eight months' computation, I now proceed to determine the period of most likely fertility.

I set scale B so that the starting day of the last menstrual period is placed opposite the month in which it occurred.

Suppose for example, the first menstrual day was January 2nd, employing scale C rotate it until 2 is opposite the column for January it will be found to be column 8. Then set lug L on scale D over the numeral on scale A which was the longest menstrual cycle found in the above computation, namely 28.

Then set lug S of scale C in a like manner for the shortest period experienced, namely 24 days on scale A. Finally reading on scales C—D, P—O are the most fertile days and F—E are the general fertile days. Reading on chart B all the days left of F to first menstrual day and from E to next menstrual day, conception is deemed impossible.

Looking at window 46, it is seen that the numeral 4 appears. This indicates four days irregularity in menstrual periods, namely 28 and 24 days respectively, as noted above.

There are various corrections needed to be provided for. Thus whenever the lug L, scale D, falls on or splits the lugs M—D, on scale B a correction is needed because a short thirty-day month is being employed, the month of February, or in a leap year, or the month of February in a normal year has been used in the calculations.

Briefly I provide for these corrections as noted on Chart X which appears on the upper right part of the base 6 of my device:

*Corrections—Chart X*

*Corrections:*—For short months—no MD lug corrections are necessary in 30-day months (April, June, September and November) except where doctors wish to get (3) readings P to O exactly, as follows: If after making first and second settings: the readings show:

(*a*) 31 on MD lug, falling under E or L, or under spaces between E and L; then correct readings by moving both F and E one space to left (while holding first setting fixed).

(*b*) 31 on MD lug, falling under spaces between F and E; then correct (3) readings by moving only F one space to left (while holding first setting fixed).

*February corrections:*—(*a*) When MD lug falls either under or partially under or between E and L; after making the usual (1) and (2) settings; then correct readings by moving both F and E, three spaces to left (only two spaces in leap years), while holding A and B fixed at (1) setting; (*b*) when MD lug falls entirely between F and E, or partially under F, after making the usual (1) and (2) settings; then correct readings by moving only F, three spaces to left (only two spaces in leap years), while holding A and B fixed at (1) setting.

Having described my invention, what I regard as new and desire to protect by Letters Patent, is:

1. A device for ascertaining the fertile periods of females comprising a base having indicia thereon, centering means on said base, three discs, lower, intermediate, and top, superimposed on said base and rotatably mounted on said centering means for manual rotation thereon, the lower disc being divided into semi-circles each semi-circle marked in thirty-one equal segments bearing day of the month numerals, lugs which extend outwardly adjacent numerals 29, 30, and 31, each lug bearing indicia indicating missing days the intermediate disc having a plurality of spaced radial lugs bearing indicia thereon to designate fertile and sterile periods, said disc bearing in arcuate form the word "Fertile" spaced from its periphery, a sequence of numerals from 0 to 10 arranged in an arc on said disc and on the same radius, the top disc having apertures adapted to register with said numerals and said word respectively, means to prevent the rotation of the top disc beyond a predetermined point, a radial lug on said top disc to indicate the longest menstrual period, a second radial lug twelve spaces from said longest period lug provided with indicia to designate the start of the last sterile period and a third radial lug located three spaces from the last named lug provided with indicia to indicate the pregnancy period, for the purpose set forth substantially as described.

2. A device for ascertaining longest and shortest menstrual cycles for females, a fixed base having indicia arranged in a circle adjacent its periphery adapted to indicate any selected day corresponding to the date of beginning of the menstrual period, two diametrically opposite spaces on said base, the surface of one of which is divided into columns in which are arranged the longest and shortest months, and indicating instructions for the first step in the operation, indicia on the other space indicating instructions for the second step, a pin in the center of said base, a disc rotatably mounted on said pin having indicia thereon adjacent its periphery divided into two semi-circles, each of which comprising successive numerals of the days of a month numbered 1 to 31 in equal divisions adapted to register with those on the base, lugs bearing indicia indicating missing days which project from the periphery of said disc at diametrically opposite points registering with numerals 29, 30 and 31, a secondary disc rotatable on said pin superimposed on the first named one having irregular day numerals and other indicia thereon, a third disc having a segment of its periphery cut away, rotatably mounted on said pin superimposed on the second disc, said third disc having an arcuate aperture and a window on the same radius cut therein, said window registering with the sequence of numerals corresponding to the irregular days between said periods, said aperture registering with said other indicia on the second disc, and a detent on the second disc which prevents the third disc rotating beyond a predetermined point in relation to said second disc.

3. A device for ascertaining longest and shortest menstrual cycles for females, a base provided with a set of numerals adjacent its periphery approximating the days of the menstrual period, a central pin on said base, a first disc rotatable on said pin provided with two sets of successive numerals adjacent its periphery each set ranging from 1 to 31 adapted to register with those on the base, radial lugs, said lugs bearing the letters MD indicating missing days on said disc adjacent the numerals 29, 30 and 31 of each set on said first disc and at diametrically opposite points, a top disc rotatable on said pin having apertures therein, an intermediate disc having indicia thereon adapted to register with said apertures, and a detent also on said intermediate disc extending into one of said apertures to prevent the rotation of said top disc beyond a predetermined point.

4. A device for ascertaining longest and shortest menstrual cycles for females, a base, three discs, lower, intermediate, and top, superimposed thereon rotatably mounted about a common center on the base, the surface of the base adjacent its periphery being divided into a plurality of equally divided radial divisions provided with a set of numerals arranged in a circle approximating the days of the menstrual periods, there being a space adjacent said circle divided into columns in which are arranged the longer and shorter months, the lower disc having radial spaces which register with those on the base provided with numerals from 1 to 31 arranged in semi-circles, diametrically opposite radial lugs on said disc located adjacent numerals 29, 30 and 31, said lugs being provided with indicia indicating missing days, a plurality of spaced radial lugs on the intermediate disc, provided with indicating means thereon to designate fertile and sterile periods, said lugs being spaced twenty spaces apart, a segment of said disc between said lugs being cut away, a radial lug which projects from said cut away portion, spaced three spaces from the fertile lug, there being a sequence of numerals from 0 to 10, arranged in an arc on said disc, and on the same radius indicia to indicate the fertile period, the top disc having apertures adapted to register with said numerals and said fertile period indicia respectively, means on the intermediate disc to prevent the rotation of the top disc beyond a predetermined point, a radial lug on said top disc to indicate the longest menstrual period, a second radial lug twelve spaces from said longest period lug provided with indicia to designate the start of the last sterile period, and a third radial lug located three spaces from the last lug provided with indicia to indicate pregnancy period for the purpose set forth substantially as described.

5. A device for ascertaining the longest and shortest menstrual cycle for females, a stationary base on which is scribed a circle which bears numerals from 20 to 50, two diametrically opposite spaces on said base, the surface of one of which is divided into columns in which are arranged the longest and shortest months and indicating instructions for the first step of the operation, indicia on the other space indicating a second step, a central pin on said base, three discs, lower, intermediate, and top, superimposed on said base and rotatably mounted on said pin, said discs being adapted to be manually rotated, the lower disc being divided into two semi-circles, each semi-circle marked in thirty-one equal segments bearing day of the month numerals, lugs extending outwardly adjacent numerals 29, 30 and 31, each lug bearing indicia indicating missing days, the intermediate disc having a plurality of spaced radial lugs bearing indicia thereon to designate fertile and sterile periods, said disc bearing in arcuate form the word "Fertile" spaced from its periphery, a sequence of numerals from 0 to 10 arranged in an arc on said disc and on the same radius, the top disc having apertures adapted to register with said numerals and said word respectively, means to prevent the rotation of the top disc beyond a predetermined point, a radial lug on said top disc to indicate the longest menstrual period, a second radial lug twelve spaces from said longest period lug provided with indicia to designate the start of the last sterile period and a third radial lug located three spaces from the last named lug provided with indicia to indicate the pregnancy period, for the purpose set forth substantially as described.

GILMORE LEE TILBROOK.